United States Patent Office 2,896,149
Patented July 21, 1959

2,896,149

ELECTRICAL GENERATOR CONTROL APPARATUS

Lewis R. Lowry, Jr., and Glenn W. Ernsberger, Lima, Ohio, assignors to Westinghouse Electric Corporation, East Pittsburgh, Pa., a corporation of Pennsylvania Application March 20, 1958, Serial No. 722,665

8 Claims. (Cl. 322—28)

This invention relates to electrical control apparatus and more particularly to regulator systems.

Electrical control apparatus, such as a regulator system, is often employed to control the excitation current applied to the field winding of a dynamoelectric machine so that a relatively constant output voltage is maintained under all normal conditions of load and environment. There are a number of well-known methods for providing control of excitation current of a dynamoelectric machine, such as the carbon pile type regulator, the vacuum tube-exciter type regulator and the magnetic amplifier type regulator. Regulator systems of the types mentioned have several disadvantages, especially for aircraft application. For maximum reliability, it is desirable that electrical control apparatus, such as a regulator system, employed with a dynamoelectric machine in an aircraft application be of the static type and that changes in the environmental conditions will have little or no effect on the operation of the regulator system. In addition, a regulator system for an aircraft application should be as small in size and weight as possible. Considering the various types of regulators listed above, the magnetic amplifier type contains no moving parts, has good resistance to environmental conditions and is reliable. A magnetic amplifier regulator, however, is larger and heavier than is desirable for aircraft applications. It is therefore desirable that a regulator system of the static type be provided which does not include magnetic amplifiers. In addition, it is desirable that such a regulator system include means for applying low level control signals for starting and stopping the flow of excitation current to the field winding of a dynamoelectric machine.

It is an object of this invention to provide a new and improved electrical control apparatus.

Another object of this invention is to provide a new and improved regulator system for a dynamoelectric machine.

A more specific object of this invention is to provide a regulator system for controlling the excitation current applied to the field of a dynamoelectric machine including means for starting and stopping the application of said excitation current by applying low level control signals to said regulator system.

Other objects of the invention will, in part, be obvious and will, in part, appear hereinafter.

Figure 1:
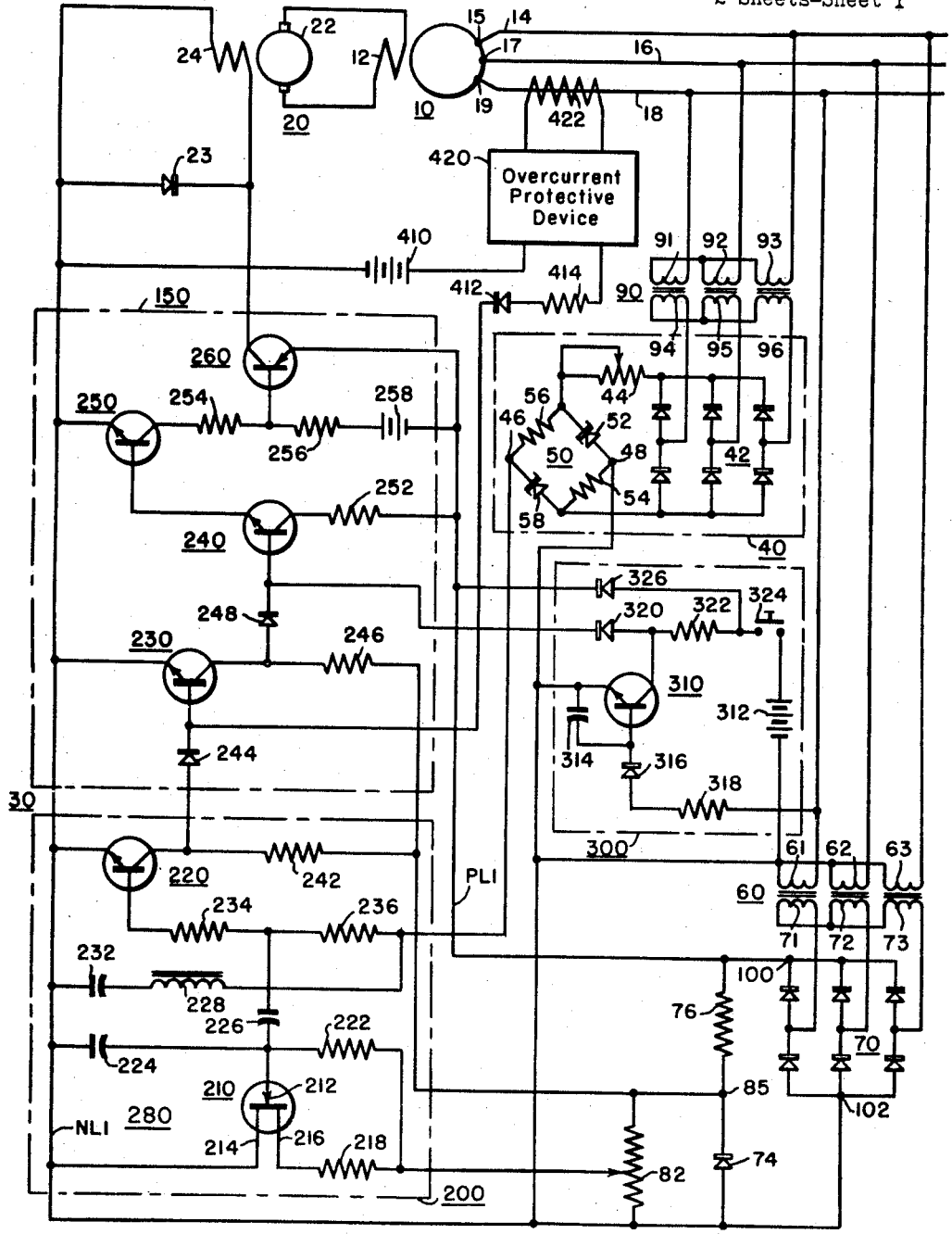
Figure 2:
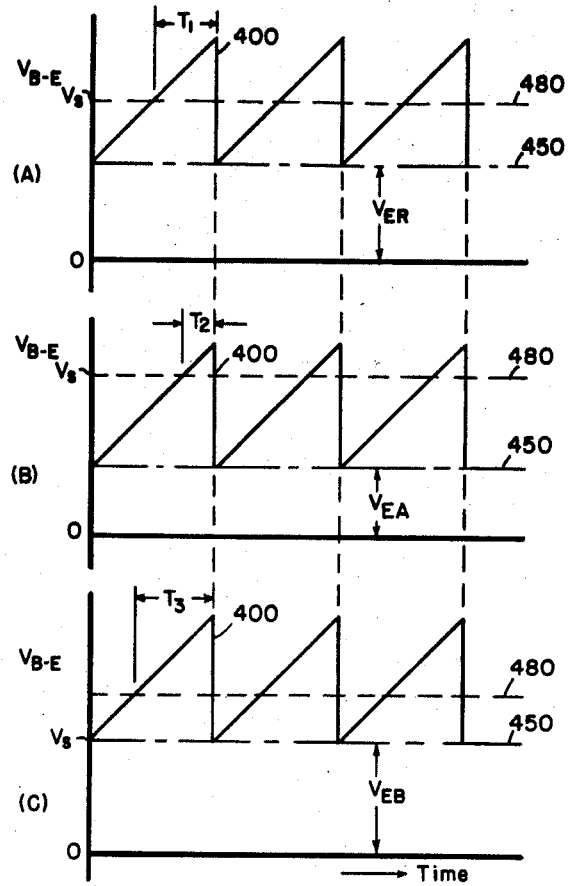
Figure 3:
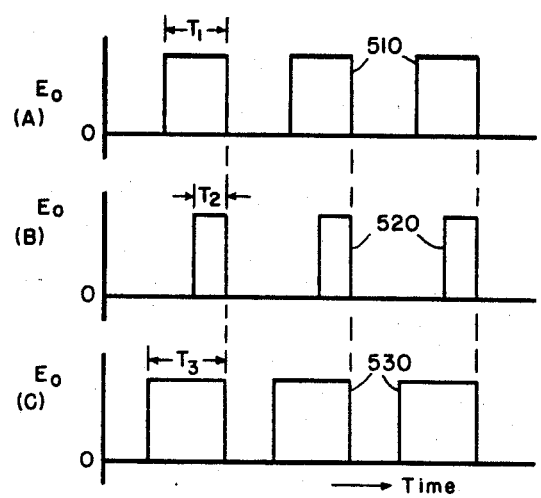

For a fuller understanding of the nature and objects of this invention, reference should be had to the following detailed description taken in conjunction with the accompanying drawing, in which:

Figure 1 is a schematic diagram of circuits and apparatus illustrating one embodiment of this invention;

Fig. 2 is a set of graphs A, B and C illustrating the operation of the pulse width modulator shown in Fig. 1 for various magnitudes of the output voltage of the dynamoelectric machine shown in Fig. 1; and, Fig. 3 is a set of graphs A, B and C illustrating the periodic output pulses from the pulse width modulator 200 for various magnitudes of the output voltage of the dynamoelectric machine shown in Fig. 1.

Referring now to the drawings and Fig. 1 in particular, there is illustrated a dynamoelectric machine, specifically a synchronous generator 10 having an excitation field winding 12 and output terminals 15, 17 and 19. In this instance, the generator 10 is disposed to supply electric power to a load (not shown) through the output terminals 15, 17 and 19 to the line conductors 14, 16 and 18, respectively, which are part of a three-phase electrical system. In order to obtain an excitation voltage across the field winding 12 of the generator 10 of relatively large magnitude, an exciter 20 is provided. In this instance, the exciter 20 comprises an armature 22 which supplies current to the field winding 12 of the generator 10 and a separate excitation field winding 24. In order to maintain the output voltage of the synchronous generator 10 at substantially a predetermined value, a regulator system 30 is connected between the output terminals 15, 17 and 19 of the generator 10 and the excitation field winding 24 of the exciter 20.

In general, the regulator system or loop 30 comprises an error detecting circuit 40 for producing a direct-current error signal or voltage which is a measure of the deviation of the output terminal voltage of the synchronous generator 10 from a reference voltage, a pulse width modulator 200 for producing periodic output pulses whose width varies with the error voltage from the error detecting circuit 40 and a pulse amplifying circuit 150 for amplifying the periodic output pulses from the pulse width modulator 200 before the pulses are applied to the field winding 24 of the exciter 20. The regulator system 30 operates to provide excitation current to the field winding 12 of the generator 10 in the form of periodic pulses whose width is varied in accordance with the output voltage of the generator 10 in order to maintain the output voltage of the generator 10 at the predetermined regulated value.

Energy for the regulator system 30 is obtained from the line conductors 14, 16 and 18, which, in turn, are connected to the output terminals 15, 17 and 19, respectively, of the generator 10. In particular, a three-phase transformer 60 having primary windings 61, 62 and 63 and secondary windings 71, 72 and 73 is responsive to the output voltage of the generator 10, the primary windings 61, 62 and 63 being connected in a Y arrangement to the line conductors 14, 16 and 18 with the neutral terminal connected to the conductor NL1. The secondary windings 71, 72 and 73 are also connected in a Y arrangement across the input terminals of a full-wave, three-phase rectifier 70. The direct current output voltage of the full-wave rectifier 70 appears at the output terminals 100 and 102 of the full-wave rectifier 70. The negative terminal 102 of the full-wave rectifier 70 is connected to the conductor NL1 and the positive terminal 100 of the full-wave rectifier 70 is connected to the conductor PL1. In order to provide a substantially constant direct current voltage for reasons which will be discussed hereinafter, the resistor 76 and the semiconductor diode 74 are connected in series circuit relationship, the series circuit being connected between the conductors NL1 and PL1 across the output of the full-wave rectifier 70. The semiconductor diode 74 is preferably of the type known to the art as a Zener diode. Since the voltage across the diode 74 is always in excess of the breakdown voltage of the diode 74, the voltage at the terminal 85, which is the common terminal between the resistor 76 and the diode 74, will be a substantially constant direct current voltage which is positive with respect to the voltage at the conductor NL1. In order to provide a substantially constant direct current voltage which can be adjusted, the potentiometer 82 is connected in parallel circuit relationship with the semiconductor diode 74 between the terminal 85 and the conductor NL1. A portion of the substantially constant direct current voltage across the diode 74 may be obtained between the arm of the potentiometer 82 and the conductor NL1. It is to be noted that the negative terminal 102 of the full-wave rectifier 70 is connected directly to one side of the field winding 24 of the exciter 20 by the conductor NL1.

In this instance, the error detecting circuit 40 comprises a well-known bridge circuit 50, a rheostat 44 and a three-phase full-wave rectifier 42. The input of the full-wave rectifier 42 is connected to be responsive to the output terminal voltage of the generator 10 at the conductors 14, 16 and 18, said input being connected to the secondary windings 94, 95 and 96 of the transformer 90 whose primary windings are connected in a Y arrangement to the line conductors 14, 16 and 18. The output of the full-wave rectifier 42 is connected across the input terminals of the bridge circuit 50 through the rheostat 44. The bridge circuit 50 includes two parallel branches, a first branch comprising the resistor 56 connected in series circuit relationship with the semiconductor diode 58 and a second branch comprising the semiconductor diode 52 and the resistor 54 connected in series circuit relationship. The semiconductor diodes 52 and 58 are preferably of the type known to the art as Zener diodes. The output voltage of the error detecting circuit appears at the output terminals 46 and 48 of the bridge circuit 50.

In the operation of the error detecting circuit 40, the direct current output voltage of the full-wave rectifier 42 is a direct current measure of the output terminal voltage of the generator 10. The rheostat 44 is provided in order to vary the portion of the output voltage of the full-wave rectifier 42 that is applied to the input terminals of the bridge circuit 50. During operation, the direct current voltage across the semiconductor diodes 52 and 58 remains substantially constant since the voltage applied to the semiconductor diodes 52 and 58 is always of a greater magnitude than the breakdown voltage of the diodes 52 and 58. It will be seen that when a direct current voltage is applied at the input terminals of the bridge circuit 50 which is equal to twice the voltage drop across each of the semiconductor diodes 52 and 58, there will be no voltage difference existing across the output terminals 46 and 48 of the error detecting circuit 40. When, however, the voltage across the input terminals of the bridge circuit 50 is either above or below the reference voltage of the bridge circuit 50, which is twice the voltage drop across each of the semiconductor diodes 52 and 58, then a voltage difference will exist across the output terminals 46 and 48 of the error detecting circuit 40. The polarity of the output voltage of the error detecting circuit 40 at the terminals 46 and 48 will depend upon whether the input voltage is above or below the reference voltage of the bridge circuit 50. In the normal range of operation of the regulator system 30, as illustrated, only one polarity of output voltage from the error detecting circuit 40 is applied to the pulse width modulator 200. The rheostat 44 is adjusted initially to obtain the desired magnitude and polarity of the output error voltage from the error detecting circuit 40. The setting of the rheostat 44 is also changed to adjust the regulated value of voltage at which the regulator system 30 maintains the output terminal voltage of the generator 10.

In general, the pulse width modulator 200 comprises a relaxation oscillator or sawtooth voltage generator 280 and a transistor 220 which is responsive to the output voltage of the sawtooth voltage generator 280 and the error voltage from the error detecting circuit 40 in order to provide periodic output pulses whose width varies with the error voltage from the error detecting circuit 40.

In particular, the sawtooth voltage generator 280 comprises the double base diode 210, the capacitor 224 and the resistors 218 and 222. The double base diode 210 includes an emitter 212, a first base connection 214 and a second base connection 216. The first base connection 214 of the double base diode is connected to the conductor NL1 and the second base connection 216 of the double base diode is connected through the resistor 218 to the arm of the potentiometer 82 in order that the voltage at the second base connection 216 be positive with respect to the voltage at the first base connection 214 of the double base diode 210. The emitter 212 of the double base diode 210 is connected to the conductor NL1 through the capacitor 224 and also to the arm of the potentiometer 82 through the resistor 222. The output voltage of the sawtooth voltage generator 280, which is substantially a sawtooth voltage, appears across the capacitor 224 between the conductor NL1 and the common terminal between the capacitor 224 and the resistor 222.

In the operation of the sawtooth voltage generator 280, the capacitor 224 charges from the voltage between the arm of the potentiometer 82 and the conductor NL1 through the resistor 222 and the parallel path which includes the emitter 212 and the second base connection 216 of the double base diode 210 and the resistor 218. When the voltage across the capacitor 224 increases to a critical breakdown voltage, which is positive at the emitter with respect to the first base connection 214 of the double base diode 210, said double base diode breaks down and the capacitor 224 discharges rapidly through the emitter 212 and the first base connection 214 of the double base diode 210. The frequency of the output voltage of the sawtooth voltage generator 280 is determined by the time constant of the components which include the capacitor 224, the resistors 218 and 222 and the double base diode 210 and also by the magnitude of the direct current voltage between the arm of the potentiometer 82 and the conductor NL1. The magnitude of the sawtooth voltage generated can be adjusted by changing the setting of the arm of the potentiometer 82. The magnitude and frequency of the output voltage of the sawtooth voltage generator 280 are normally determined or adjusted initially and then remain substantially unchanged.

In general, the transistor 220 having a base, an emitter and a collector and which is of the n-p-n junction type, is connected to be responsive to the output voltage of the sawtooth voltage generator 280 and the error voltage appearing at the output terminals 46 and 48 of the error detecting circuit 40. In particular, the emitter of the transistor 220 is connected directly to the conductor NL1 and the collector of the transistor 220 is connected to the terminal 85 through the resistor 242, the voltage at the terminal 85 being positive with respect to the voltage at the conductor NL1. The output voltage of the sawtooth voltage generator 280 is applied between the emitter and the base of the transistor 220 through the coupling capacitor 226 and the resistor 234 which are connected in series circuit relationship between the base of the transistor 220 and the common terminal between the capacitor 224 and the resistor 222. In order to apply the output error voltage of the error detecting circuit 40 between the base and the emitter of the transistor 220, the output terminal 48 of the error detecting circuit 40 is connected to the emitter of the transistor 220 through the conductor NL1 and the output terminal 46 of the error detecting circuit 40 is connected to the base of the transistor 220 through the resistors 234 and 236. The total voltage applied between the base and the emitter of the transistor 220 is substantially the sum of the output voltage from the sawtooth voltage generator 280 and the output error voltage from the error detecting circuit 40.

The capacitor 232 and the inductance 228 are connected in series circuit relationship, the series circuit being connected between the conductor NL1 and the output terminal 46 of the error detecting circuit 40 in order to provide a suitable time delay or series compensation network in the regulator system 30.

The capacitance 232 and the inductance 228 cooperate with the effective resistance of the components in the error detecting circuit 40 and the transformer 90 to form a series compensation network which stabilizes the operation of the regulator system 30 which is a closed loop system.

The transistor 220 operates in a switching mode such that when a voltage slightly in excess of the threshold voltage is applied between the base and the emitter of the transistor 220, saturation current flows from the collector to the emitter of the transistor 220. The voltage, $V_S$, necessary to cause saturation current to occur in the collector-emitter path of the transistor 220 is positive at the base with respect to the voltage at the emitter of the transistor 220. When the instantaneous sum of the output voltage from the sawtooth voltage generator 280 and the error voltage from the error detecting circuit 40 is less than the threshold voltage, the transistor 220 is substantially cut off or nonconducting. Saturation current will flow from the collector to the emitter of the transistor 220 when the instantaneous sum of the voltages from the sawtooth voltage generator 280 and the error voltage from the error detecting circuit 40 slightly exceeds the threshold voltage required between the base and the emitter of the transistor 220.

Referring to Fig. 2, the operation of the pulse width modulator 200 is illustrated by the graphs A, B and C. The output voltage of the sawtooth voltage generator 280 is represented by the curve 400. The output error voltage $V_{ER}$ from the error detecting circuit 40 is represented by the line 450. The total voltage between the base and the emitter of the transistor 220, $V_{B-E}$, is plotted on the vertical axis and time is indicated by the horizontal axis. The voltage, $V_S$, necessary to cause saturation current to flow from the collector to the emitter of the transistor 220 is represented by the line 480. Referring to graph A of Fig. 2, when the sum of the output voltage from the sawtooth voltage generator 280 represented by the curve 400 and the output error voltage, $V_{ER}$, from the error detecting circuit 40 represented by the line 450 exceeds the threshold voltage, $V_S$, represented by the line 480, saturation current will flow from the collector to the emitter of the transistor 220. When the output voltage of the generator 10 is at its regulated value, the output error voltage, as indicated by $V_{ER}$ as shown in graph A of Fig. 2, will be sufficient to cause the transistor 220 to produce periodic output pulses of voltage for approximately half the total time. Since the transistor 220 is operating in a switching mode, the transistor 220 will carry saturation current for the period indicated by $T_1$ for each cycle of the output voltage from the sawtooth voltage generator 280, as indicated by the curve 400 in graph A of Fig. 2 when the output voltage of the generator 10 is at its regulated value. The saturation current which flows from the emitter to the collector of the transistor 220 will be substantially constant during the portion of time when the transistor 220 is conducting saturation current.

Assuming that the output voltage of the generator 10 increases to a value above the regulated value, the output error voltage from the error detecting circuit will decrease to a value as indicated by $V_{EA}$ shown in graph B of Fig. 2. Therefore, the sum of the output voltage from the sawtooth voltage generator 280 and the error voltage from the error detecting circuit 40 will decrease and the transistor 220 will conduct saturation current for a shorter period, as indicated by $T_2$, during each cycle of the output voltage from the sawtooth voltage generator 280. On the other hand, if the output voltage of the generator 10 decreases to a value below the regulated value, the output error voltage from the error detecting circuit 40 will increase to a value as indicated by $V_{EB}$ in graph C of Fig. 2 and the sum of the output voltage from the sawtooth voltage generator 280 and the error voltage from the error detecting circuit 40 will increase to cause the transistor 220 to carry saturation current during a longer period as indicated by $T_3$ in graph C of Fig. 2 for each cycle of output voltage from the sawtooth voltage generator 280.

In summary, the output of the pulse width modulator 200 will be in the form of periodic output pulses, the width of which will vary in accordance with the output error voltage from the error detecting circuit 40. The width of the pulses will be greater or less depending upon whether the output voltage of the generator 10 is below or above the regulated value of the output voltage of the generator 10. Periodic pulses of current flow from the positive terminal 85, which is the common terminal between the resistor 76 and the diode 74 through the resistor 242 into the collector and out of the emitter of the transistor 220 to the conductor NL1. The pulses of current which flow from the collector to the emitter of the transistor 220 will have substantially a constant magnitude but a varying time width which depends upon the magnitude of the output error voltage from the error detecting circuit 40.

Referring to Fig. 3, the output pulses of the pulse width modulator 200 which correspond to the error voltages $V_{ER}$, $V_{EA}$ and $V_{EB}$ are substantially illustrated by the pulses 510, 520 and 530 in graphs A, B and C, respectively. The periodic pulses of output voltage, $E_O$, from the pulse width modulator 200 which are produced by the pulses of saturation current which flow from the collector to the emitter of the transistor 220 appear across the resistor 242 and are plotted on the vertical axis and time is plotted on the horizontal axis. The periodic pulses of output voltage from the pulse width modulator 200 are measured as the voltage drop between the terminal 85 and the common terminal between the collector of the transistor 220 and the resistor 242.

In general, the pulse amplifying circuit 150 is connected in circuit relationship between the pulse width modulator 200 and the field winding 24 of the exciter 20 for amplifying the periodic output pulses provided by the pulse width modulator 200. The pulse amplifying circuit 150 comprises a plurality of transistors 230, 240, 250 and 260 each having a base, an emitter and a collector. In general, the transistors 230, 240 and 250, which are of the n-p-n junction type, are connected as directly coupled amplifiers to amplify the periodic output pulses from the pulse width modulator 200 before the pulses are applied to the transistor 260, which is connected as a control element in series circuit relationship with the excitation field winding 24, the series circuit being connected across the direct current voltage output of the full-wave rectifier 70. The transistor 260, which is of the p-n-p junction type and the transistors 240 and 250, are arranged to be substantially non-conducting in the absence of periodic output pulses from the pulse width modulator 200, and the transistor 230 is arranged to be conducting in the absence of periodic output pulses from the pulse width modulator 200. The transistors 230, 240, 250 and 260 of the pulse amplifying circuit are all operated in a switching mode so that each of the said transistors is either conducting saturation current or substantially nonconducting or cutoff.

The periodic output pulses from the pulse width modulator 200 are applied to the transistor 230 to cause a change in the voltage between the base and the emitter of the transistor 230. The emitter of the transistor 230 is connected to the conductor NL1 and the base of the transistor 230 is connected to the common terminal between the collector of the transistor 220 and the resistor 242 through a blocking diode 244, the purpose of which will be explained hereinafter. The collector of the transistor 230 is connected through the resistor 246 to the positive terminal 85, which is the common terminal between the resistor 76 and the semiconductor 74 which are connected, in turn, across the output of the full-wave rectifier 70. The output of the transistor 230 is directly coupled to the input of the transistor 240, the collector of the transistor 230 being connected to the base of the transistor 240 through the blocking diode 248, the purpose of which will be explained hereinafter. The collector of the transistor 240 is connected to the positive output terminal 100 of the full-wave rectifier 70 through the resistor 252 and the conductor PL1. The output of the transistor 240 is directly coupled to the input of the transistor 250, the emitter of the transistor 240 being directly connected to the base of the transistor 250. The emitter of the transistor 250 is directly connected to the conductor NL1. The output of the transistor 250 is directly coupled to the input of the transistor 260, the collector of the transistor 250 being connected to the base of the transistor 260 through the resistor 254. The collector-emitter path of the transistor 260 is connected in series circuit relationship with the field winding 24 of the exciter 20, the collector of the transistor 260 being connected to one side of the field winding 24 and the emitter of the transistor 260 being connected to the positive terminal 100 of the full-wave rectifier 70 by the conductor PL1. A source of direct current 258 and the resistor 256 are connected in series circuit relationship, the series circuit being connected between the emitter of the transistor 260 and the base of the transistor 260 in order to reduce or substantially eliminate the leakage current which might flow to the transistor 260 in the absence of periodic output pulses from the pulse width modulator 200. The other side of the field winding 24 of the exciter 20 is connected to the conductor NL1.

The diode 23 which may be any type of well-known non-linear device which has a low forward resistance and a high backward resistance is connected in parallel circuit relationship with the field winding 24 of the exciter 20. The diode 23 is provided as a low resistance path for the voltage produced by the collapsing field of the excitation field winding 24 during periods in which the transistor 260 is nonconducting. The diode 23 prevents any excessive voltage across the transistors 230, 240, 250 and 260 due to the voltage produced by the collapsing field of the excitation field winding 24.

In operation, the transistors 230, 240, 250 and 260 of the pulse amplifying circuit 150 operate in a switching mode and the time duration of their conduction or nonconduction is proportional to the width of the periodic output pulses received from the pulse width modulator 200. In the absence of periodic output pulses from the pulse width modulator 200, the transistors 240, 250 and 260 are arranged to be nonconducting and the transistor 230 arranged to be conducting. When the transistor 220 is not conducting, the transistor 230 is arranged to be conducting since the voltage between the base and the emitter of the transistor 230 will be in excess of the threshold voltage necessary to cause saturation current to flow from the collector to the emitter of the transistor 230. When the transistor 220 is substantially nonconducting, the voltage between the base and the emitter of the transistor 230 is determined by the voltage at the terminal 85 less the voltage drop across the resistor 242 due to the current which flows through the resistor 242, the diode 244 and the base-emitter path of the transistor 230. When the transistor 220 is substantially nonconducting or cutoff, then the voltage drop across the resistor 242 will be such that the voltage between the base and the emitter of the transistor 230 will be in excess of the voltage necessary to cause saturation current to flow from the collector to the emitter of the transistor 230. When, however, periodic pulses of current flow from the collector to the emitter of the transistor 220, the voltage drop across the resistor 242 will increase and the voltage between the base and the emitter of the transistor 230 will be reduced to a value below the threshold voltage necessary to cause saturation current to flow from the collector to the emitter of the transistor 230 which will then be cut off or substantially nonconducting. The length of time during which the transistor 230 will be substantially nonconducting will be the same as the periods of time during which the pulses of saturation current flow from the collector to the emitter of the transistor 220.

When the transistor 230 is conducting, saturation current flows from the collector to the emitter of the transistor 230 and the voltage drop across the resistor 246 is sufficient to cause the transistor 240 to be substantially nonconducting, that is, the voltage between the base and the emitter of the transistor 240 is less than the threshold voltage of the latter transistor. When, however, the transistor 230 becomes nonconducting, the voltage drop across the resistor 246 decreases and the transistor 240 is turned "on" or becomes conducting since the voltage between the base and the emitter of the transistor 240 increases to a voltage in excess of the threshold voltage of the transistor 240. The length of time during which the transistor 240 conducts is determined by the length of time that the transistor 230 is nonconducting. The output current of the transistor 240 flows from the conductor PL1 through the resistor 252, into the collector and out of the emitter of the transistor 240, into the base and out of the emitter of the transistor 250 to the conductor NL1. The current which flows from the base to the emitter of the transistor 250 is an input current to the transistor 250 which is amplified by the transistor 250. The amplified output current of the transistor 250 flows from the conductor PL1 into the emitter and out of the base of the transistor 260, through the resistor 254, into the collector and out of the emitter of the transistor 250 to the conductor NL1. The current which flows from the emitter to the base of the transistor 260 is an input to the transistor 260 and is amplified by the transistor 260, the amplified current flowing from the conductor PL1 into the emitter and out of the collector of the transistor 260 through the field winding 24 of the exciter 20 to the conductor NL1.

In summary, the operation of the pulse amplifying circuit 150 is to amplify the periodic output pulses from the pulse width modulator 200 and to control the conductivity of the transistor 260 in accordance with the amplified pulses in order to vary the average excitation current applied to the excitation field winding 24 of the exciter 20. The width of the periodic output pulses from the pulse width modulator 200 determines the portion of time during which the transistor 260 is either conducting or nonconducting. The portion of time during which the transistor 260 is conducting compared to the portion of the time during which the transistor 260 is nonconducting determines the average value of the current applied to the excitation field winding 24 of the exciter 20. The average value of the current applied to the excitation field winding 24 of the exciter 20 determines the output voltage across the armature 22 of the exciter 20. The output voltage across the armature 22 of the exciter 20 determines the excitation current applied to the excitation field winding 12 of the generator 10. The output terminal voltage of the generator 10 is controlled, in turn, by the excitation current applied to the excitation field winding 12 of the generator 10. As previously explained, the excitation current applied to the field winding 24 of the exciter 20 through the emitter-collector path of the transistor 260 is supplied from the output of the full-wave rectifier 70 whose input is supplied from the output of the generator 10 through the transformer 60.

The operation of the complete regulator system 30 illustrated in Fig. 1 will now be described. The rheostat 44 of the error detecting circuit 40 is adjusted initially so that a control error voltage appears at the output terminals 46 and 48 of the error detecting circuit 40 which is positive at the terminal 46 with respect to the voltage at the terminal 48. The control voltage is also adjusted to be of the proper magnitude to cause periodic pulses as shown in graph A of Fig. 3 to appear at the output of the pulse width modulator 200 which, when amplified by the pulse amplifying circuit 150 and applied to the transistor 260, will cause a value of average current to be applied to the excitation field winding 24 of the exciter 20 which will result in a desired value of regulated voltage at the output terminals 15, 17 and 19 of the generator 10. After the rheostat 44 has been adjusted for the desired regulated value of voltage at the output terminals of the generator 10, any change in the output terminal voltage of the generator 10 will result in a change in the output voltage of the error detecting circuit 40 which appears at the terminals 46 and 48. For example, if the output terminal voltage of the generator 10 should start to drop below the regulated value, the output error voltage of the error detecting circuit 40 appearing at the terminals 46 and 48 will increase as the output terminal voltage of the generator 10 decreases. The effect of an increasing voltage at the output terminals 46 and 48 of the error detecting circuit 40 on the width of the periodic output pulses of the pulse width modulator 200 is illustrated in graph C, Fig. 3. As the output terminal voltage of the synchronous generator 10 decreases and the output voltage of the error detecting circuit 40 increases, the width of the periodic output pulses from the pulse width modulator 200 increases. The periodic output pulses of increased width from the pulse width modulator 200 are then amplified by the pulse amplifying circuit 150 and applied to the transistor 260 with the effect that the portion of time during which the transistor 260 conducts increases and the average current applied to the excitation field winding 24 also increases. The output voltage of the exciter 20 across the armature 22 also increases and the excitation current applied to the excitation field winding 12 of the generator 10 increases until the output terminal voltage of the generator 10 increases to its regulated value.

On the other hand, if the output terminal voltage of the generator 10 increases to a value above the desired regulated value, then the output voltage of the error detecting circuit 40 decreases and the width of the periodic output pulses from the pulse width modulator 200 also decreases as illustrated in graph B, Fig. 3. When the width of the periodic output pulses from the pulse width modulator 200 decreases, the output pulses applied to the transistor 260 of the pulse amplifying circuit 150 reduce the relative portion of time during which the transistor 260 is conducting and therefore reduce the average current applied to the excitation field winding 24 of the exciter 20. The output voltage of the exciter 20 and the excitation current applied to the excitation field winding 12 of the generator 10 also decreases until the output terminal voltage of the generator 10 is reduced to its regulated value.

Since the transistor 260 of the pulse amplifying circuit 150 is substantially nonconducting or cut off in the absence of an output from the pulse width modulator 200, which in turn, depends upon the output voltage of the generator 10 as a source of energy, it is necessary that some means be provided for applying a low level control signal to the regulator system 30 for starting the operation of the regulator system 30 before the output voltage of the generator 10 has increased to a predetermined value. In this instance, a starting circuit 300 is provided for applying a low level control signal to the transistor 240 for starting the operation of the regulator system 30 and the application of excitation current to the field winding 12 of the generator 10 before the output voltage of the generator 10 has increased to the predetermined value.

In particular, the starting circuit 300 comprises a source of direct current 312 and means for applying a direct current control signal to the base of the transistor 240 which includes the blocking diode 320, the resistor 322 and the push button 324. The transistor 310, which is of the n-p-n junction type, is provided in order to shunt the control signal away from the base of the transistor 240 after the output voltage of the generator 10 has increased to substantially a predetermined value. The blocking diode 320, the resistor 322 and the push button 324 of the starting circuit 300 are connected in series circuit relationship between the base of the transistor 240 and the positive side of the direct current source 312. The negative side of the direct current source 312 is connected to the conductor NL1 and to the neutral terminal of the primary windings 61, 62 and 63 of the transformer 60. The positive side of the direct current source 312 is connected to the conductor PL1 through the blocking diode 326. When the push button 324 is closed, a control current flows from the positive side of the direct current source 312 through the push button 324, through the resistor 322 and the blocking diode 320, into the base and out of the emitter of the transistor 240, into the base and out of the emitter of the transistor 250, through the conductor NL1 back to the negative side of the direct current source 312. This control current serves as an input to the transistors 240 and 250 which are then turned "on" or caused to be conducting. The input current to the transistors 240 and 250 is amplified by these transistors and the amplified current flows from the emitter to the base of the transistor 260 in the manner previously described for the normal operation of the regulator system 30. The current which flows from the emitter to the base of the transistor 260 is amplified by the transistor 260, the amplified current flowing from the emitter to the collector of the transistor 260 and through the field winding 24 of the exciter 20 so that excitation current is applied initially to the field winding 12 of the generator 10. Energy for the operation of the transistors 240, 250 and 260 is supplied from the source 312 to the conductors NL1 and PL1 through the blocking diode 326 until the output voltage of the rectifier 70 exceeds the voltage supplied by the source 312. The transistor 310 is connected, in general, to provide a low resistance path which shunts the current away from the base-emitter paths of the transistors 240 and 250 after the output voltage of the generator 10 has increased to the predetermined value. In particular, the collector of the transistor 310 is connected to the common terminal between the blocking diode 320 and the resistor 322, and the emitter of the transistor 310 is connected to the conductor NL1. The base of the transistor 310 is connected through the half-wave rectifier 316 and the resistor 318 to the line side of the primary winding 61 of the transformer 60. The transistor 310, is arranged to be substantially nonconducting in the absence of an output voltage from the generator 10 since there would be no source of base current for said transistor. When the output voltage of the generator 10 increases to the predetermined value, a half-wave rectified voltage from the primary winding 61 of the transformer 60 is applied between the base and the emitter of the transistor 310. This voltage, which is filtered by the capacitor 314 connected between the base and the emitter of the transistor 310 is applied between the emitter and the base of the transistor 310 to render the transistor 310 conducting and to cause saturation current to flow from the collector to the emitter of the transistor 310 when the output voltage of the generator 10 increases to the predetermined value. The resistance between the collector and the emitter of the transistor 310 then decreases to a negligible value and the control starting current from the direct current source 312 is shunted away from the base of the transistor 240 by the low resistance path between the collector and the emitter of the transistor 310. The blocking diode 248, which is connected between the base of the transistor 240 and the common terminal between the collector of the transistor 230 and the resistor 246, prevents the starting control current or signal from the starting circuit 300 from flowing through a low resistance path through the transistor 230 to the conductor NL1. The blocking diode 320 prevents a low resistance path through the collector-emitter path of the transistor 310 from being connected between the base of the transistor 240 and the conductor NL1 which would interfere with the normal operation of the regulator system 30.

In order to provide means for reducing the excitation current applied to the field winding 12 of the generator 10 to a negligible value, means are provided for applying a low level control signal or current to the transistor 230 of the pulse amplifying circuit 150. In general, this control signal is amplified by the transistors 230, 240, 250 and 260 to substantially reduce the excitation current applied to the field winding 12 of the generator 10 to a negligible value. In general, the control signal which is applied to the base of the transistor 230 maintains the transistor 230 in a state of conduction so that saturation current flows from the collector to the emitter of the transistor 230 regardless of the periodic output pulses from the pulse width modulator 200.

In particular, the illustrated overcurrent protective device 420 which is responsive to the output current of the generator 10 is connected to the output of the current transformer 422 which is disposed to be responsive to the current which flows in the line conductor 18. When the output current of the generator 10 reaches a maximum predetermined value, the overcurrent protective device 420 applies a control signal or current from a direct current source 410 through the resistor 414 and the blocking diode 412, into the base and out of the emitter of the transistor 230 to the conductor NL1 which is connected to the negative side of the direct current source 410. The control current applied between the base and emitter of the transistor 230 causes the transistor 230 to carry saturation current from the collector to the emitter of the transistor 230 regardless of the periodic output pulses from the pulse width modulator 200. The blocking diode 244 operates in exactly the same manner as the blocking diode 248 to prevent shunting of the control signal from the overcurrent protective device 420 and the direct current source 410 to the conductor NL1 through the collector-emitter path of the transistor 220. Although the control signal is illustrated as being applied by the operation of an overcurrent protective device 420, this low level control signal may be applied in response to any predetermined electric condition at the output terminals 15, 17 and 19 of the generator 10 or any condition of the load, (not shown), connected to the line conductors 14, 16 and 18. For example, the protective device may be responsive to overvoltage, undervoltage, overfrequency or underfrequency. Whenever the overcurrent protective device 420 applies a direct current control signal from the direct current source 410 through the resistor 414 and the blocking diode 412 into the base and out of the emitter of the transistor 230, the transistor 230 will conduct saturation current from the collector to the emitter of the transistor 230 as long as the control current or signal is applied to the base of the transistor 230. Therefore, the transistors 240, 250 and 260 will remain substantially nonconducting or cut off, regardless of whether periodic output pulses are applied to the base of the transistor 230 by the pulse width modulator 200 and substantially no excitation current will flow to the field winding 24 of the exciter 20 or to the excitation field winding 12 of the generator 10.

It is to be understood that a control voltage other than the error voltage from the error detecting circuit 40 may be applied to the pulse width modulator 200 in order to vary the width of the periodic output pulses from the pulse width modulator 200 and the average excitation current applied to the field winding 24 of the exciter 20 in order to control the excitation current applied to the field winding 12 of the generator 10. It is also to be understood that other types of relaxation oscillators or sawtooth voltage generators such as those including neon tubes or thyratron tubes may be substituted for the sawtooth voltage generator 280, shown in Fig. 1. It is also to be understood that other types of starting circuits may be substituted for the starting circuit 300 for applying a low level control signal to the base of the transistor 240 and that the starting signal may also be applied to one of the other transistors in the pulse amplifying circuit 150. It is obvious that the pulse amplifying circuit 150 could comprise more or less than four transistors as determined by the current and voltage requirements at the output of the pulse amplifying circuit 150.

It is to be understood that the source of energy or direct current for the regulator system 30 may also be a separate source of direct current or a separate source of rectified alternating current. A regulator system embodying the teachings of this invention may also be employed to control the excitation of a dynamoelectric machine, such as the generator 10 that does not have a rotating exciter. In the latter case, the series compensation network included in the regulator system 30 may be unnecessary because of the absence of the time delay introduced into the regulator system by the exciter 20.

The apparatus and circuits embodying the teachings of this invention have several advantages. For example, operating the transistors in a switching mode as pulse amplifiers allows the control of an amount of power which is many times the power rating of the transistors operating as class A amplifiers. In addition, adjusting the excitation of the generator 10 by pulse width modulation eliminates the problem of drift of the operating point and other problems associated with direct current amplifiers. A regulator system embodying the teachings of this invention also has the advantage that low level control signals may be applied to start the application of excitation current to a dynamoelectric machine or for stopping the application of excitation current or reducing the excitation current to a negligible value in response to predetermined electrical conditions at the output terminals of the dynamoelectric machine. Further, the regulator system 30 is completely static and smaller in size and weight than a conventional regulator system employing magnetic amplifiers. A regulator system constructed in accordance with this invention also has good resistance to changes in environmental conditions, reduces maintenance problems and is very reliable.

Since numerous changes may be made in the above-described apparatus and circuits and different embodiments of the invention may be made without departing from the spirit and scope thereof, it is intended that all the matter contained in the foregoing description or shown in the accompanying drawings shall be interpreted as illustrative and not in a limiting sense.

We claim as our invention:

1. In combination, a dynamoelectric machine having output terminals and an excitation field winding, first means for providing substantially a sawtooth output voltage, second means for providing a direct current control voltage, a first transistor having a base, an emitter and a collector, third means connected in circuit relationship with said first and second means for applying the sum of said sawtooth voltage and said control voltage between said base and said emitter of said first transistor to thereby cause periodic pulses of current to flow between said collector and said emitter of said first transistor which produce periodic output pulses, the width of said output pulses varying with said control voltage, a plurality of additional transistors connected in circuit relationship with said first transistor for amplifying said output pulses, and fourth means connected in circuit relationship between said transistors and said field winding for applying the amplified output pulses to said field winding as excitation current, the average value of said excitation current being controlled by said control voltage.

2. In combination, a dynamoelectric machine having output terminals and an excitation field winding, first means for providing substantially a sawtooth output voltage, second means for providing a direct current control voltage, a first transistor having a base, an emitter and a collector, third means connected in circuit relationship with said first and second means for applying the sum of said sawtooth voltage and said control voltage between said base and said emitter of said first transistor to thereby cause periodic pulses of current to flow between said collector and said emitter of said first transistor which produce periodic output pulses, the width of said output pulses varying with said control voltage, a plurality of additional transistors connected in circuit relationship with said first transistor for amplifying said output pulses, and fourth means connected in circuit relationship between said transistors and said field winding for applying the amplified output pulses to said field winding as excitation current, the average value of said excitation current being controlled by said control voltage, and fifth means connected in circuit relationship between said output terminals and one of said plurality of transistors to be responsive to a predetermined electrical condition at said output terminals for applying a control signal to said transistor, said control signal being amplified by the following transistors of said plurality to reduce the value of excitation current applied to said field winding to a negligible value.

3. In combination, a dynamoelectric machine having output terminals and an excitation field winding, first means connected in circuit relationship with said output terminals for providing substantially a sawtooth voltage, second means for providing a direct-current voltage, a first transistor having a base, an emitter and a collector, third means connected in circuit relationship with said first and second means for applying the sum of said sawtooth voltage and said control voltage between said base and said emitter of said first transistor to cause periodic pulses of current to flow between said collector and said emitter of said first transistor which produce periodic output pulses, the width of said output pulses varying with said control voltage, a plurality of switching transistors connected in circuit relationship with said first transistor for amplifying said output pulses, the final transistor of said plurality being arranged to be nonconducting in the absence of output pulses from said first transistor, fourth means connected in circuit relationship between said plurality of transistors and said field winding for applying the amplified output pulses to said field winding to control the excitation current applied thereto in accordance with said control voltage, and fifth means connected in circuit relationship between said output terminals and one of said plurality of switching transistors for applying a control signal to said switching transistor, said control signal being amplified by the following switching transistors to start conduction of said final transistor and the application of excitation current to said field winding until the output voltage of said machine increases to substantially a predetermined value.

4. In control apparatus for controlling the excitation current applied to the excitation field winding of a dynamoelectric machine having output terminals, the combination comprising a sawtooth voltage generator connected in circuit relationship with said output terminals for providing substantially a sawtooth output voltage, first means for providing a direct-current control voltage, a first transistor having a base, an emitter and a collector, second means connected in circuit relationship with said sawtooth voltage generator and said first means for applying the sum of said sawtooth voltage and said control voltage to said first transistor to cause periodic pulses of current to flow between the collector and emitter of said first transistor which produce periodic output pulses, the width of said output pulses varying with said control voltage, a plurality of switching transistors connected in circuit relationship with said first transistor for amplifying said output pulses, the final switching transistor of said plurality being arranged to be substantially nonconducting in the absence of output pulses from said first transistor, third means connected in circuit relationship between said plurality of transistors and said field winding for applying the amplified output pulses to said field winding to control the excitation current applied thereto in accordance with said control voltage, and fourth means connected in circuit relationship with one of said switching transistors for applying a control signal to said switching transistor which is amplified by said switching transistors to start conduction of said final transistor and the application of excitation current to said field winding and fifth means connected in circuit relationship with said output terminals and said fourth means for removing said control signal when the output voltage of said machine increases to substantially a predetermined value.

5. In control apparatus for controlling the excitation current applied to the excitation field winding of a dynamoelectric machine disposed to supply electrical power to a load circuit through output terminals, the combination comprising first means for providing substantially a sawtooth output voltage, second means for providing a direct-current control voltage, a transistor having a base, an emitter and a collector, said first transistor being connected in circuit relationship with said first and second means, third means connected in circuit relationship with said transistor for applying the sum of said sawtooth voltage and said control voltage to said transistor to cause periodic pulses of current to flow between said emitter and said collector of said transistor which produce periodic output pulses, the width of said output pulses varying with said control voltage, a plurality of amplifying means connected in circuit relationship with said transistor for amplifying said output pulses, fourth means connected in circuit relationship between said amplifying means and said field winding for applying the amplified output pulses to said field winding to control the excitation current applied thereto in accordance with said control voltage, fifth means connected in circuit relationship with said output terminals to be responsive to a predetermined condition of said load circuit and sixth means connected in circuit relationship between said fifth means and one of said amplifying means for applying a control signal to said amplifying means when said predetermined condition occurs to thereby reduce said excitation current to a negligible value.

6. In a regulator system for a dynamoelectric machine having output terminals and an excitation field winding, the combination comprising an error detector circuit connected in circuit relationship with said output terminals for obtaining an output error voltage which is a measure of the deviation of the output voltage of said machine from its regulated value; a pulse width modulator connected in circuit relationship with said error detecting circuit for producing periodic output pulses whose width varies with said error voltage, said modulator comprising a relaxation oscillator having output means for producing substantially a sawtooth voltage, a transistor having a base, an emitter and a collector connected in circuit relationship with said oscillator, and first means connected in circuit relationship with said transistor and said error detecting circuit for applying the sum of said sawtooth voltage and said error voltage between said emitter and said base of said transistor to cause periodic pulses of current to flow between said emitter and said collector of said transistor which produce periodic output pulses; second means connected in circuit relationship with said transistor for amplifying said output pulses; and third means connected in circuit relationship between said second means and said field winding for applying the amplified output pulses to said field winding to supply the excitation thereto in accordance with said error voltage and maintain the output voltage of said machine substantially at a predetermined regulated value.

7. In a regulator system for a dynamoelectric machine having output terminals and an excitation field winding, the combination comprising an error detecting circuit connected in circuit relationship with said output terminals for obtaining an error voltage which is a measure of the deviation of the output voltage of said machine from its regulated value, a sawtooth voltage generator connected in circuit relationship with said output terminals for producing substantially a sawtooth output voltage, a first transistor having an emitter, a base and a collector connected in circuit relationship with said error detecting circuit and said sawtooth voltage generator to be responsive to the sum of said sawtooth voltage and said error voltage and to cause periodic pulses of current to flow between said emitter and said collector of said first transistor which produce periodic output pulses, the width of said pulses varying with said error voltage, a plurality of switching transistors connected in circuit relationship with said first transistor for amplifying said output pulses, the final switching transistor of said plurality being arranged to be nonconducting in the absence of output pulses from said first transistor, second means connected in circuit relationship between said plurality of transistors and said field winding for applying the amplified output pulses to said field winding as excitation current to maintain the output voltage of said machine at a predetermined value, and third means connected in circuit relationship with one of said switching transistors for applying a control signal to said switching transistor, said control signal being amplified by the following switching transistors to start conduction of said final switching transistor and the application of excitation current to said field winding until the output voltage of said machine increases to substantially a predetermined value.

8. In a regulator system for a dynamoelectric machine having output terminals and an excitation field winding, first means for providing a substantially constant reference voltage, second means connected in circuit relationship with said output terminals and said first means for comparing the output voltage of said machine with said reference voltage to obtain an error voltage, third means for providing substantially a sawtooth output voltage, a first transistor having a base, an emitter and a collector connected in circuit relationship with said third means, fourth means connected in circuit relationship with said transistor and said second means for applying the sum of said sawtooth voltage and said error voltage between the emitter and the base of said first transistor to cause periodic pulses of current to flow between the emitter and the collector of said first transistor which produce periodic output pulses, the width of said output pulses varying with said error voltage, a plurality of transistors connected in circuit relationship with said first transistor for amplifying said output pulses, fifth means connected in circuit relationship between said plurality of transistors and said field winding for applying the amplified output pulses to said field winding as excitation current which varies with said error voltage to maintain the output voltage of said machine at substantially a predetermined value, and sixth means connected in circuit relationship with one of said plurality of transistors to be responsive to a predetermined condition of said machine for applying a control signal to said transistor, said control signal being amplified by said transistors to reduce the excitation current applied to said field winding to a negligible value.

No references cited.